United States Patent
Cheng et al.

(10) Patent No.: US 9,423,544 B2
(45) Date of Patent: Aug. 23, 2016

(54) METHOD FOR MANUFACTURING OPTICAL COMPENSATION FILM

(71) Applicant: BenQ Materials Corporation, Taoyuan (TW)

(72) Inventors: Meng-Chia Cheng, Taoyuan (TW); Lung-Hai Wu, Taoyuan (TW); Chen-Kuan Kuo, New Taipei (TW)

(73) Assignee: BenQ Materials Corporation, Taoyuan (TW)

( * ) Notice: Subject to any disclaimer, the term of this patent is extended or adjusted under 35 U.S.C. 154(b) by 0 days.

(21) Appl. No.: 14/672,223

(22) Filed: Mar. 29, 2015

(65) Prior Publication Data

US 2015/0205029 A1    Jul. 23, 2015

Related U.S. Application Data

(62) Division of application No. 13/462,829, filed on May 3, 2012, now Pat. No. 9,019,450.

(30) Foreign Application Priority Data

Jul. 12, 2011    (TW) ............... 100124661 A

(51) Int. Cl.
*G02F 1/1335*   (2006.01)
*G02B 5/30*     (2006.01)
*G02F 1/1337*   (2006.01)

(52) U.S. Cl.
CPC ............ *G02B 5/3083* (2013.01); *G02F 1/1337* (2013.01); *G02F 2001/133776* (2013.01)

(58) Field of Classification Search
CPC ...... G02B 5/3083; G02B 5/32; G02F 1/1337; G02F 2001/133776; G02F 1/13363; G02F 2001/133631
USPC .......................................... 349/117
See application file for complete search history.

(56) References Cited

U.S. PATENT DOCUMENTS

| | | |
|---|---|---|
| 6,280,889 B1 | 8/2001 | Hsieh et al. |
| 6,961,100 B2 | 11/2005 | Song |
| 7,375,784 B2 | 5/2008 | Smith et al. |

(Continued)

FOREIGN PATENT DOCUMENTS

| | | |
|---|---|---|
| CN | 100483191 C | 4/2009 |
| CN | 101861535 A | 10/2010 |

(Continued)

OTHER PUBLICATIONS

Broadband Retardation Film: Technique and Application & its English abstract. ( Inventors: H.L. Kuo, Y.P. Hsieh, S.W. Lin , Apr. 2010).

*Primary Examiner* — Nathanael R Briggs
(74) *Attorney, Agent, or Firm* — CKC & Partners Co., Ltd.

(57) ABSTRACT

An optical compensation film for a liquid crystal display is provided and comprises a liquid crystal layer which is disposed on a substrate and has a plurality of first stripe-structure regions with a first thickness and a plurality of second stripe-structure regions with a second thickness, wherein each of the second stripe-structure regions is contiguous to at least one of the first stripe-structure region and the second thickness is greater than the first thickness. The method for manufacturing the optical compensation film is provided.

9 Claims, 3 Drawing Sheets

(56) References Cited

U.S. PATENT DOCUMENTS

| | | |
|---|---|---|
| 7,916,241 B2 | 3/2011 | Mimura et al. |
| 7,920,233 B2 | 4/2011 | Hamilton et al. |
| 2010/0157212 A1 | 6/2010 | Sato et al. |
| 2011/0292330 A1* | 12/2011 | Huang ............ G02B 5/3083 349/117 |

FOREIGN PATENT DOCUMENTS

| | | |
|---|---|---|
| CN | 101971084 A | 2/2011 |
| CN | 101995687 A | 3/2011 |
| CN | 102243331 A | 11/2011 |
| JP | 2010224245 A | 10/2010 |
| TW | 200608088 A | 3/2006 |

* cited by examiner

METHOD FOR MANUFACTURING OPTICAL COMPENSATION FILM

RELATED APPLICATIONS

The present application is a divisional application of U.S. application Ser. No. 13/462,829, filed May 3, 2012, which claims priority to Taiwanese Application Serial Number 100124661, filed Jul. 12, 2011. The entire disclosures of all the above applications are hereby incorporated by reference herein.

BACKGROUND

1. Field of Invention

The disclosure relates to an optical compensation film and a method for manufacturing the same, and more particularly to an optical compensation film and an embossing method for manufacturing the same.

2. Description of Related Art

A liquid crystal display has already replaced a traditional cathode ray tube (CRT) and become a mainstream display technology. The liquid crystal display controls the penetration or shielding of light by the birefringence of liquid crystal molecules in the liquid crystal display to achieve the function of display. However, the liquid crystal display has the disadvantage of the viewing angle. Several technologies are proposed for improving the viewing angle of liquid crystal display, such as an optical compensation film, multi-domain vertical alignment (MVA) and in-plane switching (IPS). In brief, the MVA and IPS improve the viewing angle by modifying the structure of liquid crystal display panel. The optical compensation film improves the viewing angle through the phase retardation of an optical compensation film. The optical compensation film can be integrated with polarizing film into a liquid crystal display panel.

However, the conventional optical compensation film encounters the problem of red light leakage and blue light leakage when being used with a large viewing angle. Therefore, there is a need to provide an optical compensation film with a different phase retardation that is capable of compensating different colors for alleviating the aforesaid disadvantage of the prior art.

SUMMARY

An aspect of the present invention is to provide an optical compensation film for improve the aforementioned problems.

In an embodiment of the present invention, the optical compensation film comprises a liquid crystal layer which is disposed on a substrate and has a plurality of first stripe-structure regions with a first thickness and a plurality of second stripe-structure regions with a second thickness, wherein each of the second stripe-structure region is contiguous to at least one of the first stripe-structure regions and the second thickness is greater than the first thickness.

In another embodiment of the present invention, the optical compensation film comprises a substrate, a step-like structure resin layer and a liquid crystal layer. The step-like structure resin layer is formed on a surface of the substrate and has a plurality of step-like structures regularly arranged thereon. The liquid crystal layer is disposed on the step-like structure resin layer and has a plurality of first stripe-structure regions with a first thickness and a plurality of second stripe-structure regions with a second thickness, wherein the second thickness is greater than the first thickness.

According to a further aspect of the present invention, a method for manufacturing the optical compensation film is provided.

In an embodiment of the present invention, the method for manufacturing the optical compensation film comprises the following steps. Firstly, a UV curable resin is applied on a substrate. Next, the UV curable resin is embossed to form a step-like structure resin layer comprising a plurality of step-like structures. Then, the step-like structure resin layer is cured by UV light. Thereafter, a liquid crystal layer is formed on the step-like structure resin layer.

The forgoing presents a simplified summary of the disclosure in order to provide a basic understanding of the present invention. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

Many of the attendant features will be more readily appreciated as the same becomes better understood by reference to the following detailed description considered in connection with the accompanying drawings.

DETAILED DESCRIPTION

Figure 1:
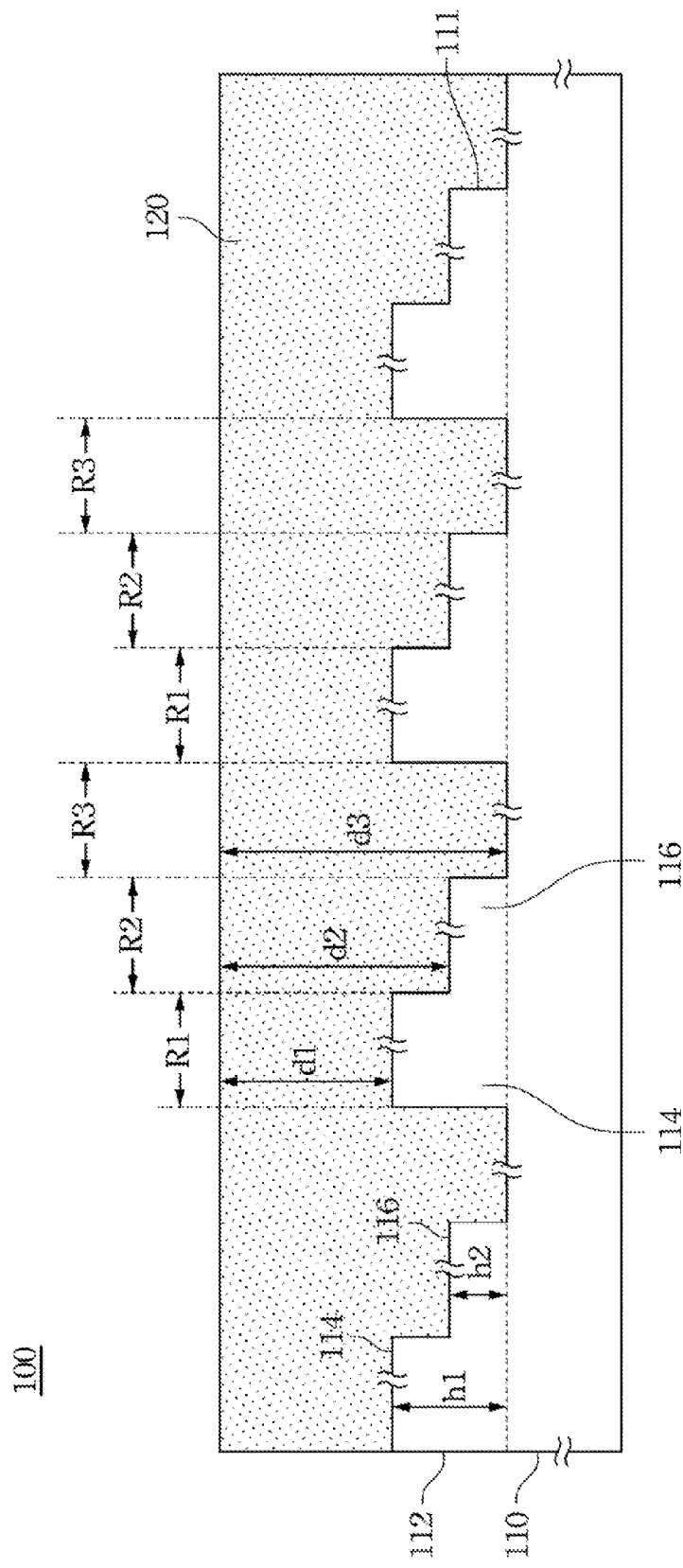
FIG. 1 is a cross-sectional view of an optical compensation film according to an embodiment of this invention.

Accordingly, an optical compensation film and a method for manufacturing the same are provided. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a cross-sectional view of an optical compensation film 100 according to an embodiment of this invention. The optical compensation film 100 can be used in birefringent light valve display equipment, such as, a liquid crystal display, to improve the viewing angle, the contrast and the display quality of a display. The optical compensation film 100 shown in FIG. 1 comprises a substrate 110 and a liquid crystal layer 120.

The substrate 110 is used to support the liquid crystal layer 120 and provides appropriate mechanical properties to the optical compensation film 100. The material of substrate 110 can be penetrated by visible light. The example of the material of substrate 110 can be cellulosic resin such as cellulose triacetate (TAC), polyesters, polycarbonates, polyamides, polystyrenes, acrylics, acetates and any appropriate transparent resin. Moreover, thermoset resin and UV curable resin can be used as the material of substrate 110, such as polyurethanes, acrylic polyurethanes, epoxy resin and silicone resin. In a preferred embodiment of the present invention, due to the consideration of polarization and durability, the substrate 110 includes cellulose triacetate (TAC).

The liquid crystal layer 120 is disposed on the substrate 110. The liquid crystal layer 120 has a plurality of first stripe-structure regions R1 with a first thickness d1 and a plurality of second stripe-structure regions R2 with a second thickness d2. Each of the second stripe-structure regions R2 is contiguous to at least one of the first stripe-structure region R1 and the second thickness d2 is greater than the first thickness d1 as shown in FIG. 1.

In an embodiment of the present invention, the liquid crystal layer 120 further comprises a plurality of third stripe-structure regions R3 with a third thickness d3, in which each of the third stripe-structure region R3 is contiguous to the second stripe-structure region R2 and the third thickness d3 is greater than the second thickness d2 as shown in FIG. 1. In an embodiment of the present invention, the liquid crystal layer 120 comprises three different thicknesses for three different phase retardations.

In another embodiment of the present invention, the optical compensation film 100 comprises a step-like structure resin layer 111 disposed on the substrate 110. The step-like structure resin layer 111 comprises a plurality of step-like structures 112 with at least two steps below the liquid crystal layer 120. In an embodiment of the present invention, the step-like structures 112 comprise an upper step 114 and a lower step 116 which are below the first stripe-structure region R1 and the second stripe-structure region R2 of the liquid crystal layer 120 respectively. In this embodiment, there is no step-like structure 112 below the third stripe-structure region R3 of the liquid crystal layer 120. Therefore, the third thickness d3 is greater than the second thickness d2. The step-like structures 112 can be regularly arranged on the substrate 110. In an embodiment of the present invention, the step-like structures 112 are formed from UV curable resin, for example.

The liquid crystal layer 120 is birefringent, and thus the different thicknesses of the liquid crystal layer 120 provide different phase retardations to compensate lights with different wavelengths. In the relevant technology, phase retardation is represented by $\Delta n \times d$, wherein $\Delta n$ is a refractive index difference of the birefringent material on two perpendicular axes, and d is an optical path. Because the lights with different wavelengths have different refractive indices, and different thicknesses of the liquid crystal layer 120 (i.e. the optical path d) of the present compensation film are respectively constructed for the various lights transmitted through the liquid crystal layer 120 in order to enable the lights in different wavelength regions to reach similar phase retardation.

In brief, the liquid crystal layer 120 has three different stripe-structure regions R1, R2 and R3 with three different thicknesses d1, d2 and d3 respectively. The first stripe-structure region R1 of the liquid crystal layer 120 has the smallest thickness (the first thickness d1) and can be used to compensate the light with a shorter wavelength, for example, the blue light. The third stripe-structure region R3 of the liquid crystal layer 120 has the greatest thickness (the third thickness d3) and can be to compensate the light with a longer wavelength, for example, the red light. The second stripe-structure region R2 of the liquid crystal layer 120 has a medium thickness (the second thickness d2) and can be used to compensate the light with a medium wavelength, for example, the green light. In an embodiment of the present invention, the first stripe-structure regions R1 are corresponding to blue pixels in the liquid crystal display panel. Similarly, the second stripe-structure regions R2 and the third stripe-structure regions R3 are correspondingly to green pixels and red pixels in the liquid crystal display panel. A width of each of the first stripe-structure regions R1, a width of each of the second stripe-structure regions R2 and a width of each of the third stripe-structure regions R3 are respectively corresponded to a width of a pixel in a liquid crystal display panel. In this embodiment, the width of each of first stripe-structure regions R1, the width of each of the second stripe-structure regions R2 and the width of each of the third stripe-structure regions R3 are in a range from 100 microns ($\mu m$) to 400 microns ($\mu m$), and preferably in a range from 200 microns ($\mu m$) to 350 microns ($\mu m$).

It is known that the optical compensation film is generally designed for compensating green light, and thus leakage of the blue light and the red light occur in a display with a large viewing angle, which will adversely affect the display quality and the contrast of the liquid crystal display. The optical compensation film of this present invention has a plurality of different stripe-structure regions to compensate lights with different wavelengths respectively so as to alleviate the aforesaid disadvantages of the prior art.

The substrate 110 can be optical isotropic or birefringent. The design of first thickness d1, the second thickness d2 and the third thickness d3 of the liquid crystal layer 120 are affected by the different optical properties of substrate 110. The different thicknesses in liquid crystal layer 120 for different substrate are described as follow.

In an embodiment of the present invention, when the substrate 110 is optically isotropic, $\Delta n \times d$ of the first stripe-structure regions R1, that of the second stripe-structure regions R2 and that of the third stripe-structure regions R3 are about 320 nm, 340 nm and 380 nm respectively. In a specific embodiment, the first thickness d1 of the liquid crystal layer 120 is about in a range from 2.3 to 2.4 microns ($\mu m$), and the second thickness d2 of the liquid crystal layer 120 is about in a range from 2.4 to 2.5 microns ($\mu m$), and the third thickness d3 of the liquid crystal layer 120 is about in a range from 2.7 to 2.8 microns ($\mu m$).

In another specific embodiment, the substrate 110 is birefringent and the $\Delta n \times d$ of the substrate 110 is about 100 nm. In this embodiment, the first thickness d1 of the liquid crystal layer 120 is about in a range from 1.6 to 1.7 microns ($\mu m$), and the second thickness d2 of the liquid crystal layer 120 is about in a range from 1.7 to 1.8 microns ($\mu m$), and the third thickness d3 of the liquid crystal layer 120 is about in a range from 2.0 to 2.1 microns ($\mu m$) thereon.

Moreover, the liquid crystal layer 120 may have different components for different types of liquid crystal display. For example, the liquid crystal layer 120 of the optical compensation film 100 for a twist nematic or vertical alignment liquid crystal display comprises A-plate and C-plate. The aforementioned A-plate and C-plate are uniaxial optical anisotropy; the optic axis of A-plate is parallel to the extension direction of the layer; and the optic axis of C-plate is vertical to the extension direction of the layer.

Figure 2:
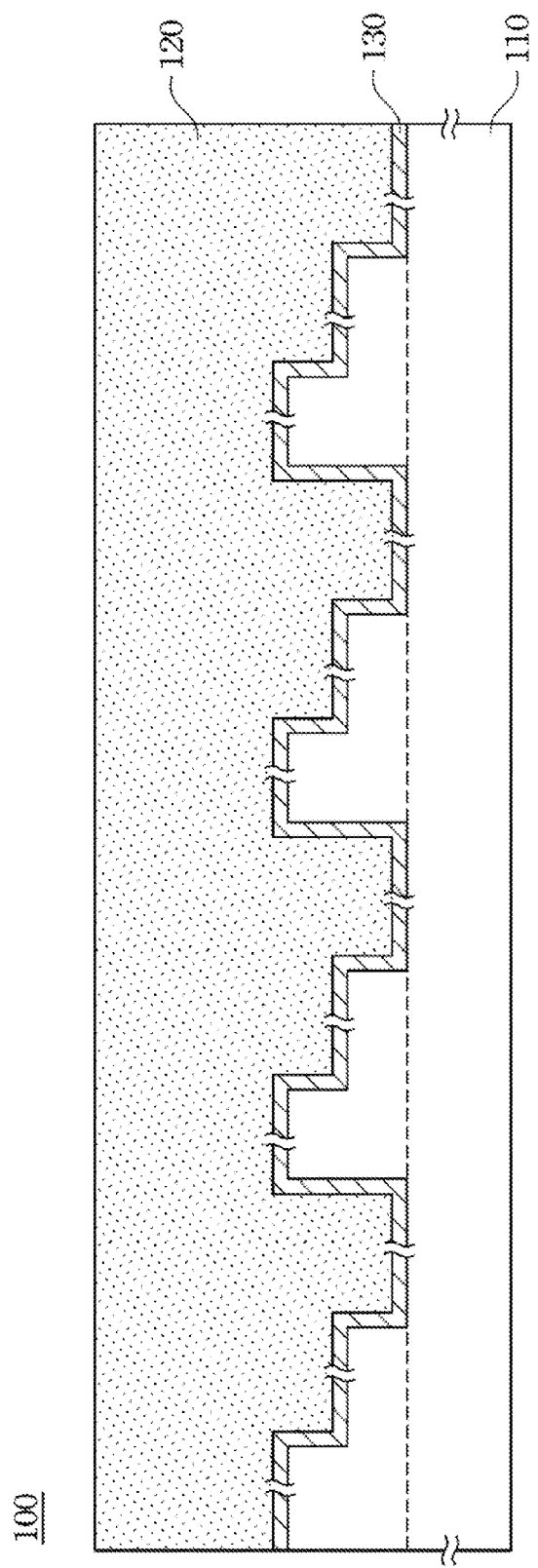
FIG. 2 is a cross-sectional view of an optical compensation film according to another embodiment of this invention.

In another embodiment of the present invention, the optical compensation film 100 further comprises an alignment film 130 disposed between the substrate 110 and the liquid crystal layer 120 as shown in FIG. 2. The alignment film 130 is adjacent to the liquid crystal layer 120 for providing the directional alignment which is required by the liquid crystal layer 120. The alignment film 130 is substantially formed along the surface of substrate 110, and thus the liquid crystal layer 120 still has different thicknesses. The alignment layer 130 can be formed on the substrate 110 by using a process known to those skilled in the art, such as a micro-scratch alignment treatment, a rubbing treatment, photo-alignment, $SiO_2$ evaporation or ion-beam alignment.

According to a further aspect of the present invention, a method for manufacturing the optical compensation film is provided. A preferred embodiment of the method of the present invention is illustrated by FIGS. 3A to 3C.

Figure 3A:
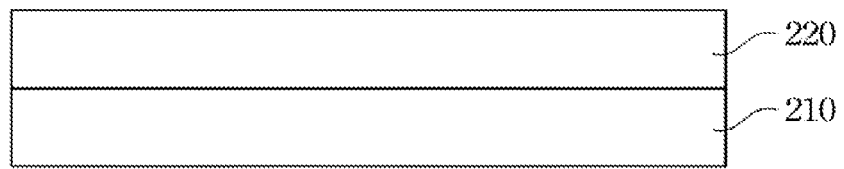
FIGS. 3A to 3C illustrates a flowchart showing a method for manufacturing the optical compensation film according to an embodiment of this invention.
Figure 3B:
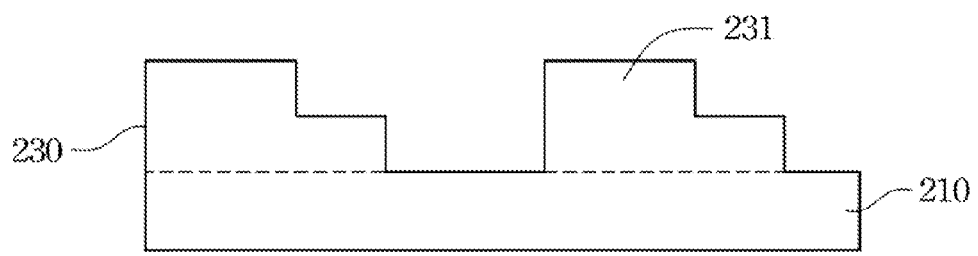
Figure 3C:
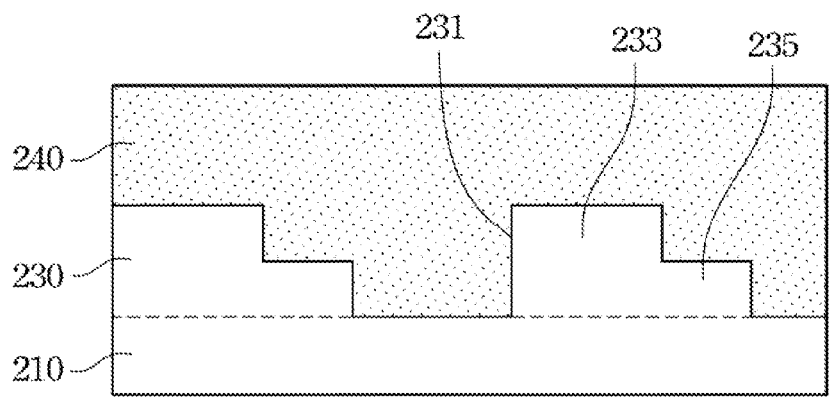

FIGS. 3A to 3C illustrate the steps in a method for manufacturing the optical compensation film according to an embodiment of the present invention. First, a substrate 210 is provided. Then, an UV curable resin 220 is applied on the substrate 210 by a process known to those skilled in the art, such as, slit coating, roller coating or die coating, as shown in FIG. 3A. After the UV curable resin 220 is applied, the solvent in the UV curable resin 220 can be optionally removed by a drying treatment. Before the UV curing treatment, the UV curable resin 220 has adequate liquidity. However, the UV curable resin 220 is cured and has certain hardness after the UV curing treatment. In a preferred embodiment of the method of the present invention, the UV curable resin 220 has appropriate visible light transmittance.

After the UV curable resin 220 is applied on the substrate 210, the UV curable resin 220 is embossed to form a step-like structure resin layer 230 comprising a plurality of step-like structures 231. The embossing treatment can be performed by using a stamp or a roller having a predetermined structure formed on the surface of the stamp or roller. In an embodiment of the method of the present invention, the embossing treatment is performed by using a grooved roller, for example. The surface of the roller is molded with a plurality of step-like structures comprising an upper step and a lower step regularly arranged, and the step-like structures on the roller are transferred to the UV curable resin 220 to form a plurality of step-like structures 231 regularly arranged on the substrate 210. In brief, the protruding parts of the step-like structure 231 on the compensation film 210 are form by the concave parts of the step-like structures on the grooved roller, such that the step-like structures 231 of the step-like structure resin layer 230 comprises an upper step 233 and a lower step 235, and the thickness of the upper step 233 and the lower step 235 are different, as shown in FIG. 3B.

After the embossing treatment, the step-like structure resin layer 230 is conducted by using a UV curing treatment. The wavelength of the UV light used in the UV curing treatment and the application time of curing are adjusted for the different types of materials. After the embossing treatment, an alignment treatment is performed on the step-like structure resin layer 230 optionally, such as rubbing process that is known to those skilled in the art, so as to facilitate the alignment of the liquid crystal molecules subsequently. In another embodiment of the method of the present invention, after the step-like structure resin layer 230 is cured, an alignment layer is formed on the step-like structure resin layer 230 and an alignment treatment is conducted to the alignment layer optionally, for example, the alignment treatment is photo alignment. The alignment layer can be formed by a process known to those skilled in the art, such as a micro-scratch alignment treatment, SiO$_2$ evaporation or ion-beam alignment. In still another embodiment of the method of the present invention, an alignment layer is not necessary to be formed, and the liquid crystal molecules are aligned by predetermined alignment grooves on the step-like structure layer 230 which are formed with the step-like structure layer 230 by the embossing treatment.

After the UV curing treatment, a liquid crystal layer 240 is formed on the step-like structure layer 230. The liquid crystal layer 240 can be formed by a process known to those skilled in the art, such as slit coating. In an embodiment of the method of the present invention, a fluid with liquid crystal molecules is coated on the step-like structure layer 230, and then a heat treatment is performed on the liquid crystal layer 240.

According to a further another aspect of the present invention, an optical compensation film 100 comprising a substrate 110, a step-like structure resin layer 111 and a liquid crystal layer 120 is provided, as shown in FIG. 1. The step-like structure resin layer 111 has a plurality of step-like structures 112 formed on a surface of the substrate 110, in which the step-like structures 112 are regularly arranged on the substrate 110 comprising an upper step 114 and a lower step 116. The liquid crystal layer 120 is disposed on the step-like structure resin layer 111 and has a plurality of first stripe-structure regions R1 with a first thickness d1 and a plurality of second stripe-structure regions R2 with a second thickness d2, and the second thickness d2 is greater than the first thickness d1.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of manufacturing an optical compensation film, the method comprising:
   applying an UV curable resin on a substrate;
   embossing the UV curable resin to form a step-like structure resin layer comprising a plurality of step-like structures;
   curing the step-like structure resin layer by UV light; and
   forming a liquid crystal layer on the step-like structure layer which has been cured, wherein the liquid crystal layer has a plurality of first stripe-structure regions with a first thickness, a plurality of second stripe-structure regions with a second thickness and a plurality of third stripe-structure regions with a third thickness, wherein the second thickness is greater than the first thickness and the third thickness is greater than the second thickness.

2. The method of claim 1, wherein the step-like structure resin layer has step-like structures respectively disposed below the first stripe-structure regions and the second stripe-structure regions.

3. The method of claim 1, wherein a width of each of the first stripe-structure regions, a width of each of the second stripe-structure regions and a width of each of the third stripe-structure regions are respectively corresponding to a width of a pixel in a liquid crystal display panel.

4. The method of claim 1, wherein the substrate is birefringent, and the first thickness is in a range from 1.6 microns ($\mu$m) to 1.7 microns ($\mu$m), and the second thickness is in a range from 1.7 microns ($\mu$m) to 1.8 microns ($\mu$m), and the third thickness is in a range from 2.0 microns ($\mu$m) to 2.1 microns ($\mu$m) thereon.

5. The method of claim 1, wherein the substrate is optically isotropic, the first thickness is in a range from 2.3 microns ($\mu$m) to 2.4 microns ($\mu$m), and the second thickness is in a range from 2.4 microns ($\mu$m) to 2.5 microns ($\mu$m), and the third thickness is in the range from 2.7 microns ($\mu$m) to 2.8 microns ($\mu$m).

6. The method of claim 1, wherein the step-like structure resin layer has step-like structures with at least two steps and is contiguous to the liquid crystal layer.

7. The method of claim 1, further comprising: forming an alignment layer by performing an alignment treatment on the step-like structure resin layer after curing the step-like structure resin layer.

8. The method of claim 7, wherein the alignment treatment is photo alignment, micro-scratch alignment, SiO$_2$ evaporation or ion-beam alignment.

9. The method of claim 1, further comprising: forming a predetermined alignment grooves on the step-like structure layer with the step-like structure layer by embossing.

* * * * *